(12) United States Patent
Zhang et al.

(10) Patent No.: US 12,055,431 B2
(45) Date of Patent: Aug. 6, 2024

(54) HYSTERESIS COMPENSATION METHOD FOR A WEIGHING DEVICE

(71) Applicants: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

(72) Inventors: Song Zhang, Changzhou (CN); Shenhui Wang, Changzhou (CN); Shenjian Qian, Changzhou (CN); Qin Sun, Changzhou (CN)

(73) Assignees: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 373 days.

(21) Appl. No.: 17/631,000

(22) PCT Filed: Jul. 29, 2020

(86) PCT No.: PCT/CN2020/105354
§ 371 (c)(1),
(2) Date: Jan. 28, 2022

(87) PCT Pub. No.: WO2021/018160
PCT Pub. Date: Feb. 4, 2021

(65) Prior Publication Data
US 2022/0268622 A1    Aug. 25, 2022

(30) Foreign Application Priority Data

Jul. 31, 2019  (CN) .......................... 201910699874.3

(51) Int. Cl.
*G01G 23/01*  (2006.01)
*G01G 23/37*  (2006.01)

(52) U.S. Cl.
CPC ......... *G01G 23/01* (2013.01); *G01G 23/3714* (2013.01)

(58) Field of Classification Search
CPC ........................... G01G 23/01; G01G 23/3714
(Continued)

(56) References Cited

U.S. PATENT DOCUMENTS 5,308,931 A * 5/1994 Griffen ................ G01G 3/1414
177/25.14
6,928,853 B2 * 8/2005 Koenig ................ G01G 3/1416
73/1.08
7,292,951 B2   11/2007 Aust

FOREIGN PATENT DOCUMENTS

CN       101650215 A    2/2010
CN       104374453 A    2/2015
(Continued)

OTHER PUBLICATIONS

Zijian, Z. et al., A New Hysteresis Compensation Method For Load Cells, Transactions of Nanjing University of Aeronautics & Astronautics, Jun. 2002, pp. 89-93, vol. 19, No. 1.
(Continued)

*Primary Examiner* — Jacques M Saint Surin
(74) *Attorney, Agent, or Firm* — Standley Law Group LLP; Jeffrey S. Standley; Adam J. Smith

(57) ABSTRACT

A hysteresis compensation method, in which a hysteresis error is calculated for an obtained weighing value by means of an ideal hysteresis error model, and an ideal compensation value is further calculated by means of an ideal hysteresis compensation model, wherein by using a proportional relationship between a system hysteresis error model established in hysteresis calibration and the ideal hysteresis
(Continued)

error model, the ideal compensation value is corrected to a final compensation value. The method establishes a mapping relationship between the system's own hysteresis compensation and the ideal state hysteresis compensation, and realizes the transformation of a complicated hysteresis error compensation situation into an ideal hysteresis error compensation situation. The method not only has a good compensation effect for the hysteresis error compensation under ideal situations, but also can obtain an excellent hysteresis compensation effect under complicated hysteresis situations.

13 Claims, 3 Drawing Sheets

(58) Field of Classification Search
   USPC .......................................................... 177/50
   See application file for complete search history.

(56) References Cited

FOREIGN PATENT DOCUMENTS

| CN | 105737962 A | 7/2016 |
| CN | 109297579 A | 2/2019 |
| JP | 10-148566 A | 6/1998 |
| JP | H10148566 * | 6/1998 |
| JP | 2014196973 * | 10/2014 |
| WO | WO-2021018160 A1 * | 2/2021 ............. G01G 23/01 |

OTHER PUBLICATIONS

Makabe, M. et al., Practical Creep and Hysteresis Error Compensation Method for Load Cell, SICE Annual Conference in Sapporo, Aug. 4-6, 2004, pp. 77-83.

* cited by examiner

HYSTERESIS COMPENSATION METHOD FOR A WEIGHING DEVICE

BACKGROUND OF THE INVENTION

Technical Field

The present invention relates to a hysteresis compensation method for a weighing device.

Background Art

The hysteresis error is one of main causes for weighing errors in a weighing sensor or the weighing system in general. Compensating for or correcting the hysteresis error of the weighing sensor or the weighing system is essential for improving the weighing precision of the weighing sensor or the weighing system, which contributes for accurate weighing data measurement and weighing applications.

The existing hysteresis compensation method for a weighing sensor or a weighing system generally have problems of low applicability, unreliable compensation effect, and limited compensation application range. For example, in the document titled "A NEW HYSTERESIS COMPENSATION METHOD FOR LOAD CELLS" Zhu Zijian and Chen Renwen, June 2002: vol. 19, No. 1:89-93, an e-exponential or a similar mathematical method is used for compensating hysteresis errors for a weighting sensor or a weighing system, and the e-exponential or the similar mathematical method and the envelope curve shape for a hysteresis calibration need to satisfy a certain fitting relationship. This fitting relationship cannot be guaranteed in practice due to complicated weighing sensor or weighing system, thereby resulting in a poor hysteresis compensation effect for the weighing sensor or the weighing system. Moreover, when complicated weighing sensor or weighing system is subjected to hysteresis, there is even a crossover in envelope curves for hysteresis calibration, resulting in a situation in which the compensation error is zero at the intersection during hysteresis compensation, and further resulting in an uncertain state for the hysteresis compensation method, which affects the reliability of the compensation effect of the hysteresis compensation method for the weighing sensor or the weighing system, and limits the application range of the hysteresis compensation method.

SUMMARY

The technical problem to be solved by the present invention is the limited application ranges and unreliable compensation effects of the prior art hysteresis compensation methods. The technical problems associated with the prior art devices is solved by a new hysteresis compensation method. The method utilizes the system's own hysteresis compensation in conjunction with an ideal hysteresis compensation and achieves an excellent hysteresis compensation effect in a complicated hysteresis situation.

The present invention provides a hysteresis compensation method, in which a hysteresis error is calculated for an obtained weighing value by means of an ideal hysteresis error model, and an ideal compensation value is further calculated by means of an ideal hysteresis compensation model. By using a proportional relationship between a system hysteresis error model established in hysteresis calibration and the ideal hysteresis error model, the ideal compensation value is corrected to a final compensation value.

The present invention leverages the proportional relationship between the ideal hysteresis error and the system hysteresis error obtained by hysteresis calibration in order to simplify the known complicated hysteresis situation. The complicated hysteresis situation can be represented as ideal hysteresis situation, thereby further correcting on ideal hysteresis compensation value, which improves the precision of hysteresis compensation. Good precision can be achieved in spite of the presence of a cross line in the envelop curves of hysteresis calibration.

Among them, the ideal hysteresis error and the ideal hysteresis compensation both use the calculation model for hysteresis errors and error compensation in the prior art to realize the calculation of ideal hysteresis compensation.

Preferably, the establishment of the system hysteresis error model comprises the steps of:

recording weight data output by a scale and position information of a standard weight on a scale platform during the sequential and individual loading and unloading of the standard weight at any position on the scale platform; and calculating, for each group of the weight data, loading and unloading hysteresis errors, respectively, and establishing the system hysteresis error model in conjunction with the corresponding position information.

In the present invention, the position information and the loading and unloading hysteresis error corresponding to the position information are taken as parameters of the system hysteresis error model or as the basis for parameter calculation. It is no longer limited to the selection of few fixed test points on the scale platform during the calibration process. In addition, more points can be sampled in calibration, which improves the accuracy of the error calculation, and at the same time, the selection of any test point on the weighing tray also simplifies the operation during calibration.

Preferably, the proportional relationship is a proportional function of the data of the system hysteresis error model and data of the ideal hysteresis error model.

In the present invention, the ratio between each data in the system hysteresis error model and each data in the ideal hysteresis error model is used to constitute a proportional function, through which the compensation value is corrected.

Preferably, the final compensation value is a product of the ideal compensation value and the proportional relationship.

Preferably, the system hysteresis error model comprises a quadratic function fitted by combining each group of loading and unloading hysteresis errors with the corresponding position information. The present invention uses the method of fitting a quadratic function to quickly establish a system hysteresis error model and reduce the extent of dependency on the system.

Preferably, each group of loading hysteresis errors (ErrUp) and unloading hysteresis errors (ErrDown) are derived from loading measurement value (Weight1) and unloading measurement value (Weight2) at any test point, such that:

$$ErrUp = Weight1 - (Weight1 + Weight2)/2$$

$$ErrDown = Weight2 - (Weight1 + Weight2)/2.$$

Preferably, establishing the ideal hysteresis error model comprises the steps of:
  obtaining the maximum hysteresis error of the scale at a full range; and
  then fitting, during loading and unloading, a function with hysteresis errors at no-load, full-load and several points between no-load and full-load respectively, wherein the function constitutes the ideal hysteresis error model.

The present invention samples a plurality of points from the no-load to the full-load process to fit the function, thereby improving the precision of the proposed ideal hysteresis error model.

Preferably, the function is a quadratic function, or an exponential function, or a polynomial function.

Preferably, the ideal hysteresis compensation model comprises a loading compensation correction factor and an unloading compensation correction factor, wherein:
  the loading compensation correction factor=AI+BI*raw_count+CI*raw_count^2; and
  the unloading compensation correction factor=AD+BD*raw_count+CD*raw_count^2;
  where AI, BI and CI, and AD, BD and CD are parameters obtained after calculation by means of the ideal hysteresis error model; raw_count is an uncompensated value; and the loading compensation correction factor and the unloading compensation correction factor are output compensation values.

Preferably, the ideal hysteresis compensation model comprises following formulas:
  a loading compensation formula: correction_factor=AI+BI*raw_count+CI*raw_count^2+AIE*[(RMAX-raw_count)/(RMAX-change_sign_value)];
  an unloading compensation formula: correction_factor=AD*raw_count+BD*raw_count+CD*raw_count^2+ADE*[raw_count/change_sign_value];
  where AI, BI and CI, and AD, BD and CD are parameters obtained after calculation by means of the ideal hysteresis error model; raw_count is an uncompensated value; correction_factor is an output compensation value; AIE is the difference between an initial value during loading and an ideal curve; ADE is the difference between an initial value during unloading and an ideal curve; RMAX is the range of the scale; and change_sign_value is an initial value.

Preferably, the scale is a platform scale comprising at least three weighing sensors provided therein.

The positive and progressive effects of the present invention are as follows:
  the present invention establishes a mapping relationship between the system's own hysteresis compensation and the ideal state hysteresis compensation, and realizes the transformation of a complicated hysteresis error compensation situation into an ideal hysteresis error compensation situation. The present invention not only has a good compensation effect for the hysteresis error compensation under ideal situations, but also can obtain an excellent hysteresis compensation effect under complicated hysteresis situations.

BRIEF DESCRIPTION OF THE DRAWINGS

The hysteresis compensation method for weighing device according to the invention will be described hereinafter through embodiments shown schematically in the drawings, wherein.

DETAILED DESCRIPTION OF EMBODIMENTS

The present invention is further illustrated below by way of embodiments, but is not thus limited within the scope of the embodiments.

The present invention uses calibration data to establish a system hysteresis error model, which combines the existing ideal hysteresis model, and uses a mapping relationship between the system hysteresis error model and the ideal hysteresis error model to adjust the hysteresis compensation value, thereby realizing the transformation of a complicated hysteresis error compensation situation into an ideal hysteresis error compensation situation. The scheme not only has a good compensation effect for hysteresis errors under ideal conditions, but also has a good compensation effect under complicated situations and even crossover situations.

By way of the embodiments as described below, the implementations of the present invention are illustrated by way of examples.

Figure 3:
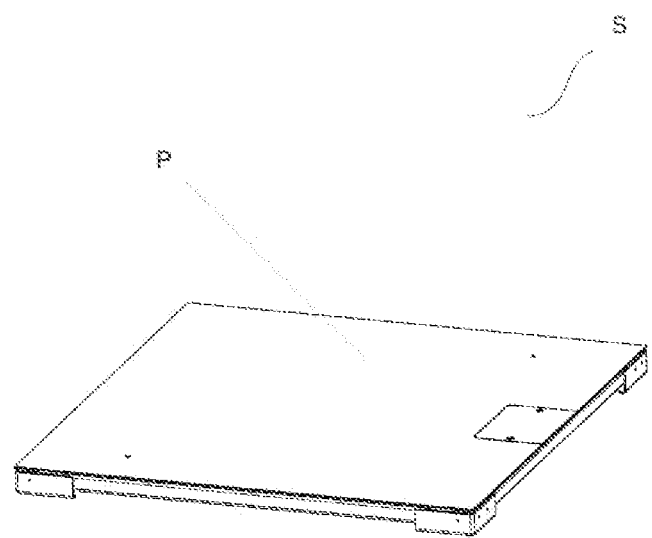
FIG. 3 is schematic diagram of a scale.

In a platform scale S as shown in FIG. 3, a standard weight is selected within the range of a platform scale S, and the standard weight is loaded and unloaded on a weighing tray at any position on the weighing tray, and loading and unloading measurement values as well as position information of the standard weight on the weighing tray are recorded.

Figure 1:
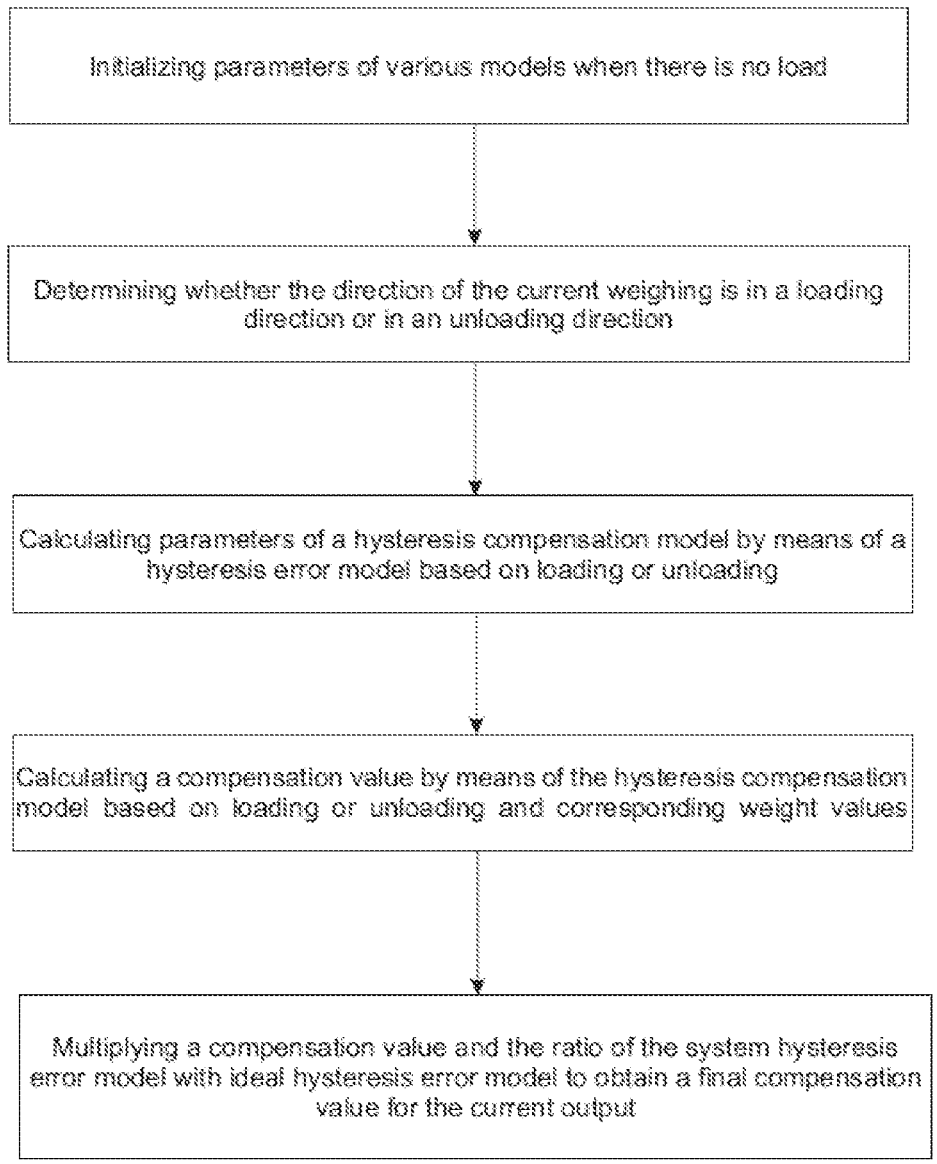
FIG. 1 is a flow chart of hysteresis compensation in an embodiment of the present invention.
Figure 2:
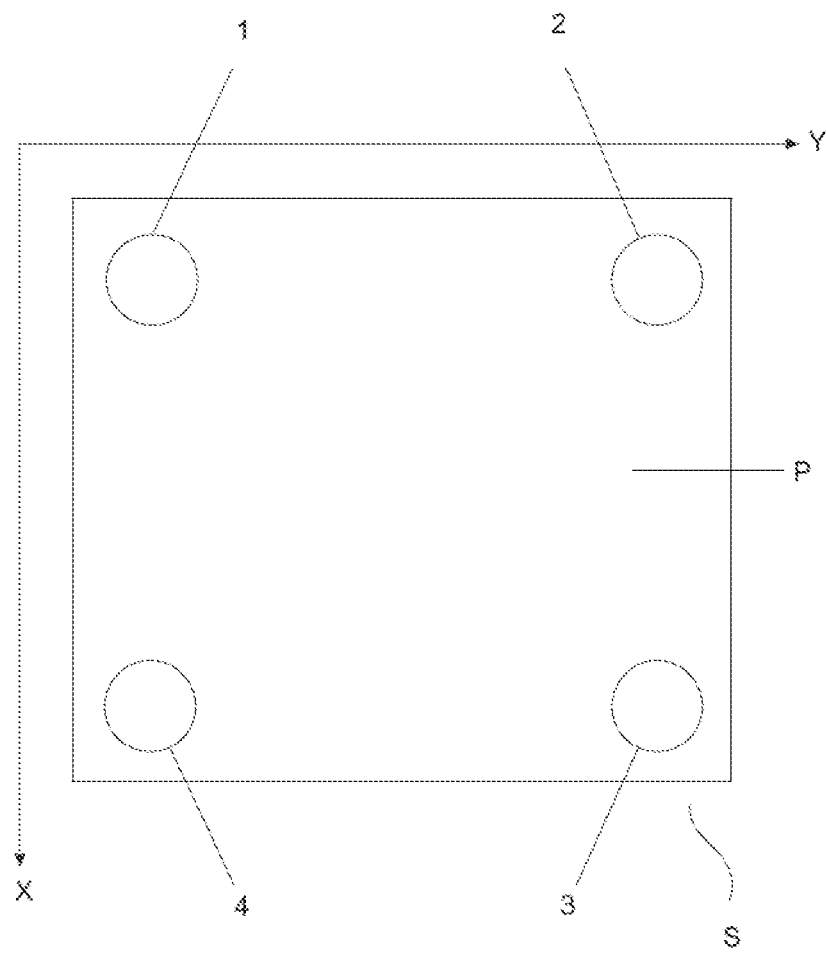
FIG. 2 is a schematic diagram of a scale platform.

In the schematic diagram of a scale platform P as shown in FIG. 2, a weighing sensor is provided on each of the four corners of the scale platform P of this embodiment, and coordinates are established on the scale platform P according to the coordinate system shown in FIG. 2, and the position information of the weighed object on the scale platform P is calculated by using the existing barycenter position calculation algorithm for weighed objects.

In this embodiment, the standard weight is loaded and unloaded at four different positions A, B, C, and D shown in FIG. 2, and the measurement values and position information of the four positions as well as the weight values of the standard weight are obtained at this time. The hysteresis errors are calculated, and the calculation formulas are as follows.

If Weight1 and Weight2 are loading and unloading measurement values at any test point, hysteresis errors ErrUp and ErrDown for the loading and unloading are respectively as follows:

$$ErrUp = Weight1 - (Weight1 + Weight2)/2$$

$$ErrDown = Weight2 - (Weight1 + Weight2)/2.$$

The weight data of the four sequentially numbered weighing sensors in the scale S as shown in FIG. 2 are denoted as W1t, W2t, W3t, W4t, respectively. Then the weight of the weighted object is denoted as Wot=W1 t+W2t+W3t+W4t.

The barycenter position information of the weighed object on the scale platform P are calculated as Xot and Yot:

$$Xot = (W3t + W4t)/Wot;$$

$$Yot = (W2t + W3t)/Wot;$$

Then, position information of the four different positions A, B, C and D and loading and unloading hysteresis errors are grouped as a quadratic function, which is taken as a system hysteresis error model.

In another embodiment, the weighing sensor 1 is omitted, and W1 is replaced by the standard weighing data W, so that three weighing sensors are implemented to calculate the barycenter position information of the weighted object on the scale platform P.

In still another embodiment, a matrix of 7×7 on the scale platform P is used and the barycenter position of the weighted object is calculated using a neural network algorithm or the like.

In this embodiment, the full-range value W_max of the platform scale S is determined according to the weight value for the standard weight, and the maximum hysteresis error max_largest is obtained according to the measurement values for loading and unloading operations on the scale platform P, and then the loading process is fitted into a quadratic equation by three points (0, 0), (W_max/2, −max_largest) and (W_max, 0), and the unloading process is fitted into a quadratic equation by three points (0, 0), (W_max/2, max_largest) and (W_max, 0). These two quadratic equations are taken as an ideal hysteresis error model.

In another embodiment, a quadratic equation is fitted by using six points including no-load and full-load in the process from no-load to full-load, through which the precision of the constructed quantity hysteresis error model is improved. In addition, more points can be sampled, and different fittings such as exponential fitting and polynomial fitting can be used to improve the precision or computational efficiency of the ideal hysteresis error model.

In the establishment of the hysteresis compensation model, for the loading process, the hysteresis compensation formula is:

$$\frac{\text{loading compensation}}{\text{correction factor}} = AI + BI*\text{raw\_count} + CI*\text{raw\_count}^\wedge 2,$$

where AI, BI and CI are parameters obtained after calculation by means of the ideal hysteresis error model; raw_count is an uncompensated value; and correction_factor is an output compensation value.

In another embodiment, considering that there is a case where loading and unloading are not zero-load or full-range, an e-exponential function may be further introduced to correct the compensation value. In this embodiment, the e-exponential is simplified to a linear function, and at this time, the hysteresis compensation formula during loading is as follows:

$$\text{correction\_factor} = AI + BI*\text{raw\_count} + CI*\text{raw\_count}^\wedge 2 +$$

$$AIE*[(RMA \times \text{raw\_count})/(RMAX - \text{change\_sign\_value})],$$

where AIE is the difference between an initial value during loading and an ideal curve, RMAX is a system range, and change_sign_value is a point initial value.

In addition to the hysteresis compensation for the loading process, in this embodiment, the hysteresis compensation formula for the unloading process is:

$$\frac{\text{unloading compensation}}{\text{correction factor}} = AD + BD*\text{raw\_count} + CD*\text{raw\_count}^\wedge 2,$$

where AD, BD and CD are parameters obtained after calculation by means of the ideal hysteresis error model; raw_count is an uncompensated value; and correction_factor is an output compensation value.

In another embodiment, the e-exponential is simplified to a linear function, and at the time, the hysteresis compensation formula during unloading is as follows:

$$\text{correction\_factor} = AD*\text{raw\_count} + BD*\text{raw\_count} +$$

$$CD*\text{raw\_count}^\wedge 2 + ADE*[\text{raw\_count}/\text{change\_sign\_value})],$$

where ADE is the difference between an initial value during unloading and an ideal curve; and change_sign_value is a point initial value.

An ideal hysteresis compensation model is constructed by the above compensation formulas for the loading and unloading processes. In this embodiment, the ideal hysteresis error model and the ideal hysteresis compensation model are combined to form an ideal hysteresis model.

After the platform scale records the above system hysteresis error model and the ideal hysteresis model, the hysteresis compensation procedure in this embodiment is as follows:

When the scale is unloaded, parameters such as AIE, ADE, and parameters in the current loading and unloading direction as well as in the previous loading and unloading direction in each model are initialized. In this embodiment, when initialized, the above parameters can be reset to zero.

Then, the direction is determined, that is, according to the comparison between the current measurement value as well as the previous measurement value, and the preset thresholds, it is determined whether the direction of this weighing is loading or unloading.

Then, the compensation value is calculated. For the loading process, it is determined whether the previous loading and unloading direction is different from the current loading and unloading direction, if so, the parameters such as AIE are recalculated by using the ideal hysteresis error model, and the weight value for the current loading is recorded, and then a compensation amount is calculated based on the loading compensation formula described above or the loading compensation formula simplified by using the e-exponential. If they are the same, the parameters such as AIE and the weight value for the current loading are directly used, and the compensation value is calculated based on the loading compensation formula described above or the loading compensation formula simplified by using the e-exponential.

For the unloading process, the calculation method is similar. It is also determined whether the previous loading and unloading direction is different from the current loading and unloading direction, if so, the parameters such as ADE are recalculated by using the ideal hysteresis error model, and the weight value for the current unloading is recorded, and then a compensation amount is calculated based on the unloading compensation formula described above or the unloading compensation formula simplified by using the e-exponential. If they are the same, the parameters such as ADE and the weight value for the current unloading are directly used, and the compensation amount is calculated based on the unloading compensation formula described above or the unloading compensation formula simplified by using the e-exponential.

Finally, the compensation value is calculated, and the proportional function between the system hysteresis error model and the ideal hysteresis error model is calculated under the current loading and unloading state. The compensation amount calculated by the ideal hysteresis compensation model is multiplied by the proportional function to obtain a final compensation value for the current output.

In another embodiment, a 6×6 array of weighing sensors is provided on the platform scale S. And, a neural network algorithm, a genetic algorithm, and the like are used to calculate state information, such as the barycenter position and the object shape of a weighted object on the scale platform P. And further, the state information is used to correct the hysteresis compensation value and provide the compensation precision; or during the weighing loading or unloading process, the hysteresis error and parameters calculated by means of the system hysteresis error model and the ideal hysteresis error model are corrected so as to provide a high precision for the hysteresis compensation calculation.

Through the above description of the hysteresis compensation procedure, it can be clearly understood by those skilled in the art that the present invention can be implemented by means of software and necessary hardware platforms. Based on such understanding, the technical solutions of the present invention, essentially or for a contribution part in the prior art, can be embodied in the form of a software product, wherein the computer software product may be stored in a storage medium, comprising but not limited to a ROM/RAM (Read Only Memory/Random Access Memory), a magnetic disk, an optical disk, etc., and may comprise several instructions for causing one or more computer devices (which may be a personal computer, a server, or a network device, or the like) to perform the manner described in the various embodiments or in certain parts of the embodiments of the present invention.

The hysteresis compensation procedure of the present invention may be described in the general context of the computer-executable instructions to be executed by a computer, such as a program module. Generally, the program module includes programs, objects, components, data structures, and so on that execute particular tasks or implement particular abstract data types. The present invention may also be practiced in a distributed computing environment in which the tasks are executed by remote processing devices that are connected via a communications network. In the distributed computing environment, the program module may be located in local and remote computer storage media including the storage device.

Although the specific implementations of the present invention are described above, a person skilled in the art should understand that these are only exemplary, and the scope of protection of the present invention is defined by the attached claims. A person skilled in the art can make various changes or modifications to these implementations without departing from the principle and spirit of the present invention, but all the changes or modifications fall within the scope of protection of the present invention.

LIST OF REFERENCE SYMBOLS 1-4 Weighing sensors
S Platform scale
P Scale platform

The invention claimed is:

1. A hysteresis compensation method, comprising the steps of:
   calculating a hysteresis error for an obtained weighing value by means of an ideal hysteresis error model;
   calculating an ideal compensation value by means of an ideal hysteresis compensation model; and
   correcting the ideal compensation value to a final compensation value by using a proportional relationship between a system hysteresis error model established in hysteresis calibration and the ideal hysteresis error model.

2. The hysteresis compensation method of claim 1, wherein the system hysteresis error model is established by a method comprising the steps of:
   recording weight data output by a scale and position information of a standard weight on a scale platform during a sequential and individual loading and unloading of the standard weight at any position on the scale platform;
   calculating, for each group of the recorded weight data, loading and unloading hysteresis errors, respectively; and
   establishing the system hysteresis error model in conjunction with the corresponding position information.

3. The hysteresis compensation method of claim 1, wherein the proportional relationship is a proportional function of data of the system hysteresis error model and data of the ideal hysteresis error model.

4. The hysteresis compensation method of claim 3, wherein the final compensation value is a product of the ideal compensation value and the proportional relationship.

5. The hysteresis compensation method of claim 2, wherein the system hysteresis error model comprises a quadratic function fitted by combining each group of loading and unloading hysteresis errors with the corresponding position information.

6. The hysteresis compensation method of claim 5, wherein each group of loading hysteresis errors (ErrUp) and unloading hysteresis errors (ErrDown) are derived from loading measurement value (Weight1) and unloading measurement value (Weight2) at any test point, using the formulas:

$$ErrUp = Weight1 - (Weight1 + Weight2)/2$$

$$ErrDown = Weight2 - (Weight1 + Weight2)/2.$$

7. The hysteresis compensation method of claim 1, wherein the ideal hysteresis error model is established by a method comprising steps of:
   obtaining a maximum hysteresis error of the scale (S) at a full range; and
   fitting, during loading and unloading, a function with hysteresis errors at no-load, full-load and several points between no-load and full-load respectively, wherein the function constitutes the ideal hysteresis error model.

8. The hysteresis compensation method of claim 7, wherein the function is a quadratic function.

9. The hysteresis compensation method of claim 1, wherein the ideal hysteresis compensation model comprises a loading compensation correction factor F1 and an unloading compensation correction factor F2, according to the formulas:

$$F1 = AI + BI*RC + CI*(RC)^2$$

and $$F2 = AD + BD*RC + CD*(RC)^2$$

where:
- AI, BI and CI, and AD, BD and CD are parameters obtained after calculation by means of the ideal hysteresis error model;
- RC ("raw count") is an uncompensated value; and
- F1 and F2 are output compensation values.

10. The hysteresis compensation method of claim 1, wherein the ideal hysteresis compensation model comprises formulas for a loading compensation correction factor F3 and an unloading compensation correction factor F4, as follows:

$$F3 = AI + BI*RC + CI*(RC)^2 + AIE*[(RMAX - RC)/(RMAX - CSV)]$$

and $$F4 = AD + BD*RC + CD*(RC)^2 + ADE*[(RC)/(CSV)]$$

where:
- AI, BI and CI, and AD, BD and CD are parameters obtained after calculation by means of the ideal hysteresis error model;
- RC ("raw-count") is an uncompensated value;
- F3 and F4 are output compensation values;
- AIE is the difference between an initial value during loading and an ideal curve;
- ADE is the difference between an initial value during unloading and an ideal curve;
- RMAX is range of the scale (S); and
- CSV ("change sign value") is an initial value.

11. The hysteresis compensation method of claim 2, wherein the scale (S) is a platform scale comprising at least three weighing sensors provided therein.

12. The hysteresis compensation method of claim 7, wherein the function is an exponential function.

13. The hysteresis compensation method of claim 7, wherein the function is a polynomial function.

* * * * *

UNITED STATES PATENT AND TRADEMARK OFFICE
CERTIFICATE OF CORRECTION

PATENT NO.         : 12,055,431 B2
APPLICATION NO.    : 17/631000
DATED              : August 6, 2024
INVENTOR(S)        : Zhang et al.

It is certified that error appears in the above-identified patent and that said Letters Patent is hereby corrected as shown below:

In the Specification

In Column 4, Line 61, please delete "." at the end of the line.

In Column 4, Line 67, please delete "Wot=W1 t+W2t+W3t+W4t" and insert
-- Wot = W1t + W2t + W3t + W4t --.

In Column 5, Lines 47-48, please delete "$loading\ compensation\ correction\ factor = AI + BI * raw\_count + CI * raw\_count^2,$" and insert -- **loading compensation correction factor = AI + BI * raw_count + CI * raw_count^2**, --.

In Column 5, Lines 63-65, please delete "$correction\ factor = AI + BI * raw\_count + CI * raw\_count^2 + AIE * [(RMAX \times raw\_count)/(RMAX - change\_sign\_value)],$" and insert -- correction_factor = AI + BI * raw_count + CI * raw_count^2 + AIE * [(RMAX - raw_count)/(RMAX – change_sign_value)], --.

In Column 6, Lines 9-10, please delete "$unloading\ compensation\ correction\ factor = AD + BD * raw\_count + CD * raw\_count^2,$" and insert -- **unloading compensation correction factor = AD + BD * raw_count + CD * raw_count^2**, --.

In Column 6, Lines 22-24, please delete "$correction\ factor = AD * raw\_count + BD * raw\_count + CD * raw\_count^2 + ADE * [raw\_count/change\_sign\_value].$" and insert -- correction_factor = AD * raw_count + BD * raw_count + CD * raw_count^2 + ADE * [raw_count/change_sign_value], --.

Signed and Sealed this
First Day of October, 2024

*Katherine Kelly Vidal*

Katherine Kelly Vidal
*Director of the United States Patent and Trademark Office*

CERTIFICATE OF CORRECTION (continued)
U.S. Pat. No. 12,055,431 B2

In the Claims

In Column 9, Lines 10-14, Claim 9, please delete "$F1 = AI + BI * RC + CI * (RC)^2$ and $F2 = AD + BD * RC + CD * (RC)^2$," and insert
-- $F1 = AI + BI* RC + CI * (RC)^2$
and
$F2 = AD + BD* RC + CD * (RC)^2$ --.

In Column 9, Line 16, Claim 9, please delete "where;" and insert -- where: --.

In Column 10, Lines 1-5, Claim 10, please delete "$F3 = AI + BI * RC + CI * (RC)^2 + AIE * [(RMAX - RC)/(RMAX - CSV)]$ and $F4 = AD + BD * RC + CD * (RC)^2 + ADE * [(RC)/(CSV)]$"
and insert -- $F3 = AI + BI * RC + CI * (RC)^2 + AIE * [(RMAX - RC)/ (RMAX - CSV)]$
and
$F4 = AD + BD * RC + CD * (RC)^2 + ADE * [(RC)/ (CSV)]$ --.